March 31, 1964 A. K. LYLE 3,127,033
GLASS FURNACE BATCH CHARGING APPARATUS
AND CONTROL MEANS THEREFOR
Filed Sept. 29, 1961 2 Sheets-Sheet 1

INVENTOR
AARON K. LYLE

BY *Jeller, McCormick, Paulding & Huber*

ATTORNEYS

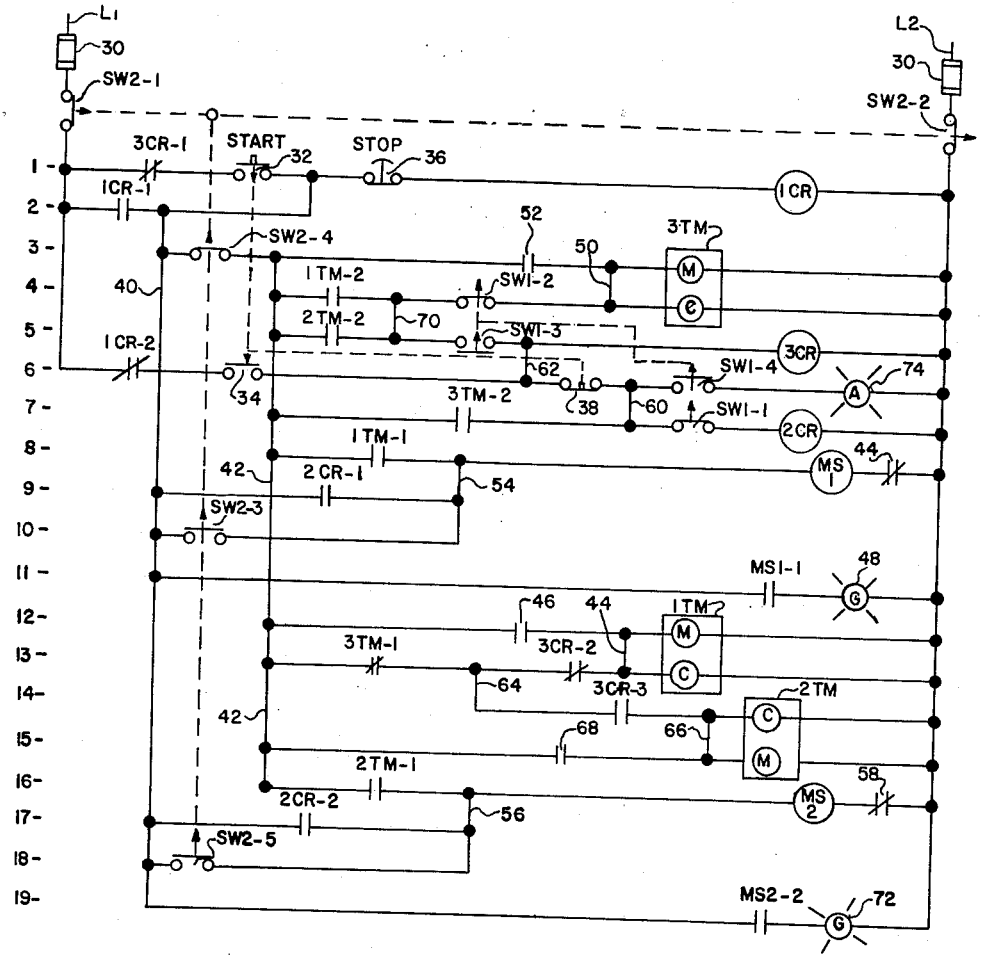

United States Patent Office 3,127,033
Patented Mar. 31, 1964

3,127,033
GLASS FURNACE BATCH CHARGING APPARATUS
AND CONTROL MEANS THEREFOR
Aaron K. Lyle, West Hartford, Conn., assignor to Emhart
Manufacturing Company, Hartford, Conn., a corporation of Delaware
Filed Sept. 29, 1961, Ser. No. 141,852
6 Claims. (Cl. 214—18)

This invention relates to glass making and, more particularly, to methods and apparatus for controlling the feeding or charging of a glass melting furnace with glass making constituents or "batch."

Glass melting furnaces ordinarily are rectangular and they are supplied with batch at one end where it is melted to form a part of the molten body of glass being discharged at the other end of the furnace. As shown in the Lyle U.S. Patent 2,246,375, the batch is fed to the furnace through "dog houses" positioned at the melting end thereof, and it is usual, particularly in the case of a furnace in which glass is being made continuously, to make use of an automatic batch feeder or charger to feed the batch from a hopper or other source of supply to and through each dog house onto the surface of the body of molten glass. In practice, batch fed in this manner through a dog house will form a relatively narrow elongated mass on the surface of the glass bath.

It is highly desirable, and it is an object of the present invention, to provide methods of and apparatus for controlling the feeding or charging of batch to the furnace through one or more dog houses so as to assure a selected distribution of the batch on the glass bath in the melting portion of the furnace.

It is a more specific object of the invention to provide for the charging of batch in discrete masses or charges which will be distributed automatically in a selected pattern toward either or both sides of the furnace at the melting end thereof; or toward and along the longitudinal center line of the furnace; or toward either or both of the sides and along the center line of the furnace. In this connection, it is to be noted that more furnace heat is available along the central portion of the furnace than at the sides thereof. The present invention provides control means whereby under one method of operation (the "dual" method to be described) twice as many charges will be introduced to the central portion as will be introduced to either side of the furnace. Further, under this preferred method, the distribution of the batches will be symmetrical on each side of the furnace center line. Therefore, it is believed that this will be the preferred method or pattern of operation in most cases.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 shows batch being fed through the dog house by the left-hand batch feeder at an early stage in the operation of the apparatus;

FIG. 9 shows the wiring diagram of the batch feeding control apparatus;

FIG. 10 is a chart showing the positions of the switch contacts operated by the pattern selector switch; and FIG. 11 is a chart showing the positions of the switch contacts operated by the control selector switch.

Figure 1:
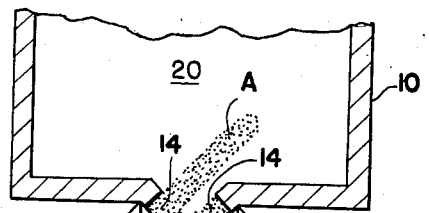
FIG. 1 is a schematic fragmentary plan view of the melting end portion of a glass melting furnace having a dog house and a pair of batch feeders located at the dog house for the feeding of glass batch. Further.
Figure 2:
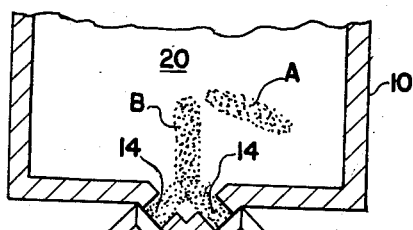
FIG. 2 is similar to FIG. 1 but shows both batch feeders or chargers in operation at a stage immediately following the stage of operation shown in FIG. 1 when the control apparatus is set for "dual" pattern distribution.

Referring more particularly to FIGS. 1–8, the glass melting furnace is designated by the reference number 10 and its dog house at the melting end of the said furnace is designated by the numeral 12. As shown, the said dog house is located centrally on the rear end wall of the furnace and it comprises a generally triangular appendage having two walls projecting outwardly from the said rear wall and meeting preferably at a 90° angle. Each of these walls of the dog house has an opening 14 through which the glass batch is fed into the furnace. A batch charger 16 is located in the opening of the left-hand wall of the dog house and a charger 18 is located in the opening of the right-hand wall of the dog house.

The batch feeders or chargers 16 and 18 are similar and may be of the type shown in the Lorenz United States Patent 2,471,336. As shown in that patent, the feeders or chargers 16 and 18 may be mounted on tracks for movement toward and away from the furnace, and as also shown in the Lorenz patent, the chargers are driven by electric motors to reciprocate a pusher which thrusts batch from a hopper in each charger through the associated window 14 in the dog house. As will be made more clear hereinafter, a charger is only very rarely operated continuously. In the preferred methods of operation, a charger is operated for a period of time (which can be controlled automatically) during which time the reciprocating pusher shoves a discrete amount or "charge" of batch into the furnace 10 where the batch floats on the surface of the molten body of glass 20 therein until the batch melts.

As will be described more fully, the chargers 16 and 18 can be operated alternately wherein one charger will commence operation for a timed period immediately after the other charger has completed operation for a timed period. If desired, one charger can be operated for a timed period and then stopped, and after a period of delay, the other charger can be operated. If desired, one charger can be operated for a timed period followed by a timed period of simultaneous operation of both chargers at reduced rates and then followed by a period of operation by the other charger. These various methods of operation will be referred to hereinafter as following an "alternate" pattern, a "delay" pattern, or a "dual" pattern. In addition, the chargers 16 and 18 may be operated simultaneously or independently apart from the aforesaid automatically timed patterns.

Figure 3:
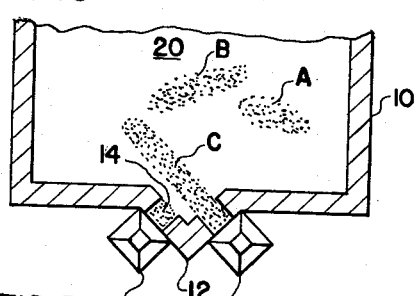
FIG. 3 is like FIGS. 1 and 2, but it shows the right-hand feeder in operation in the third stage of dual pattern control.
Figure 4:
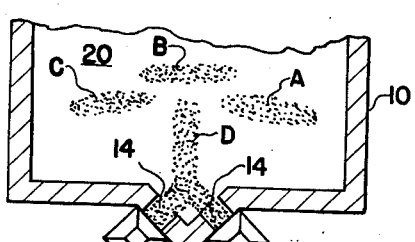
FIG. 4 is like the prior figures, but shows both chargers in operation during the fourth stage of dual pattern control.
Figure 5:
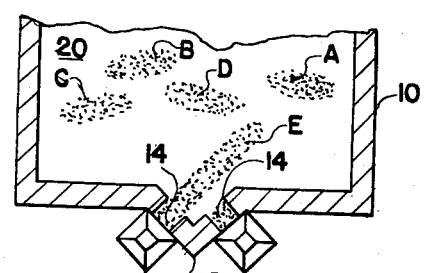
FIGS. 5, 6, 7 and 8 are similar to FIGS. 1–4, but show the fifth, sixth, seventh and eighth stages, respectively, of dual pattern distribution.
Figure 6:
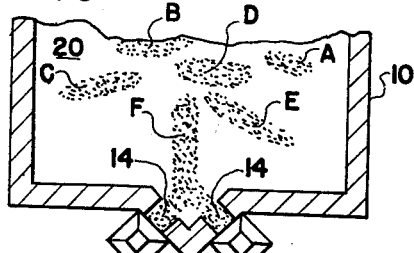
Figure 7:
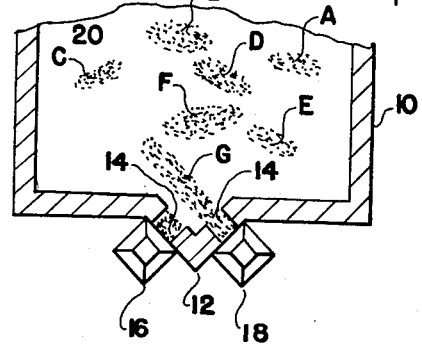
Figure 8:
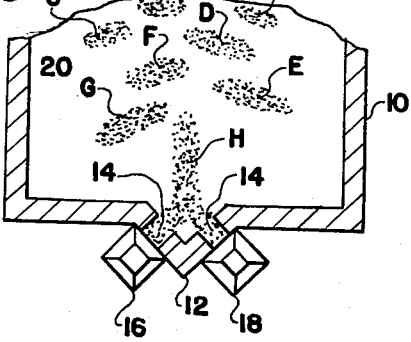

FIGS. 1–8 illustrate the operation under the dual pattern method of distribution. In FIG. 1 it will be observed that the left-hand or No. 1 charger 16 is being operated to thrust a charge A of batch toward the right-hand wall of the furnace 10. This charge or discrete mass of batch floats on top of the molten glass and continues in a path generally toward the right during the second stage of charger operation shown in FIG. 2. In this second stage of operation, both chargers 16 and 18 are operated but at substantially half speed in order to form a second charge B which may be greater or less about equal in size to the first charge A, depending upon the time of operation. The charge B as shown in FIG. 3 moves generally along the longitudinal center line of the furnace 10 during the third stage of operation when only the right-hand or No. 2 charger 18 is being operated (at the same speed as the charger 16) to define a charge or mass C which is directed generally toward the left-hand wall of the furnace 10. As shown in FIG. 4, the fourth stage of operation requires that both chargers 16 and 18 be operated approximately half speed to define a charge D which moves generally centrally of the furnace. Then, at the fifth stage shown in FIG. 5, the left-hand charger 16 operates at its original speed to define a charge E which is directed toward the right-hand side of the furnace like the charge A before it. At the sixth stage (FIG. 6), both chargers are operated at half speed to form the charge F along the center line of the furnace following the charges B and D. Then, at the seventh stage of operation, a charge G is thrust toward the left-hand side of the furnace by the right-hand charger 18, and at FIG. 8 there is shown a formation of a charge H by operation at half speed of both of the chargers.

This operational sequence continues for as long as the furnace is being used under dual pattern operation, and it will be observed that while there is distribution of charges toward the sides, twice as many charges are directed along the central portion of the furnace than at either side thereof. This takes advantage of the greater amount of heat available at the central portion of the furnace, and in most cases dual pattern operation will be preferred.

When operating in accordance with the delay pattern mentioned above, the sequence will be as shown in FIGS. 1, 3, 5 and 7. However, between each stage of operation shown by these figures of the drawings, there will be a period of delay when neither charger is operated to thrust batch into the furnace. It will be understood that the delay pattern operation will provide for a different distribution of the charges of batch than shown in the drawings, and the delay pattern may be utilized when a low rate of charging is desired or when more time is required because of low melting rates.

When operating according to the alternate pattern, the sequence of operations will also be as shown in FIGS. 1, 3, 5 and 7, but there will be no period of time delay between the various stages of operation depicted therein. Obviously, this will provide for a still different pattern of distribution of batch charges in the furnace as may be desired, for example, in charging relatively narrow furnaces.

Selection of the pattern for distribution is effected by a selector switch SW1 having a plurality of contacts forming a part of the control circuitry to be described in connection with FIG. 9. The pattern selector switch per se is not shown, but FIG. 10 provides a chart showing the different settings of the switch contacts in the circuitry of FIG. 9 for alternate, delay, and dual operation.

In addition to the selectivity of pattern, selectivity of charger operation is provided. That is, a selector switch SW2 is provided for operation of either of the chargers 16 and 18, or both of them, without pattern, or for timer operation of the said chargers in accordance with a selected pattern. The switch SW2 per se is not shown, but FIG. 11 provides a chart showing the positions for the various contacts in the circuitry of FIG. 9 at the various settings that the said selector switch may be located.

Obviously, in feeding the glass melting furnace in accordance with any pattern or method of operation selected, it is desirable to feed no more batch thereto than is needed to supply the demand made upon the furnace for molten glass. Therefore, in a preferred installation, means are provided for automatically or manually adjusting the feed rate of the chargers 16 and 18. The automatic means includes a molten glass level indicator and recorder such as shown in the Cannon et al. United States Patent 2,483,333. As shown in that patent, the indicator includes a probe which senses the level of the molten glass in the furnace and records that level on a chart substantially continuously.

There is also included a variable speed electric drive for the motors for each of the chargers 16 and 18 and an electro-electronic controller for varying the voltage of the drive and thus the speeds of the motors. A drive adapted for this purpose is manufactured by Reliance Electric and Engineering Co., Cleveland, Ohio, and is known commercially as the "Reliance V.S. Jr. Drive."

When automatically controlling rate, the molten glass level indicator and recorder, in addition to recording the level of molten glass in the furnace operates means which transmits an electrical signal to the Reliance drive unit responsive to the level of the glass and this signal will vary in keeping with the rate of discharge of the molten glass from the furnace. If glass is being removed from the furnace at a rate which reduces the level of the molten glass therein, the signal transmitted to the Reliance drive unit will cause it automatically to increase the rate of the adjustable speed motors for the batch chargers 16 and 18 and thus increase the amount of batch being supplied to the furnace for any unit of time. Therefore, the rate of batch feed for the furnace can be automatically adjusted to maintain a desired amount of molten glass in the furnace.

However, the rate of feed for the furnace need not be automatically controlled as described. In the preferred installation, a third selector switch is provided which can be set either for manual operation or for automatic operation. When set for manual operation, the said selector switch disconnects the molten glass level indicator and recorder from the variable speed drive control, and means are provided manually for selecting a predetermined electrical signal for transmission to the drive so as to operate the motors at a desired rate.

However, the present invention is not involved in the manual or automatic selection of feed rates to maintain a desired supply in the furnace. The present invention relates more to the means for controlling operation of the chargers to effect the different patterns of operation heretofore described. This control means is electrical in nature and a wiring diagram thereof is shown in FIG. 9. This control circuitry does include relay means operating switch contacts in the Reliance drive to change the rates of operation of the adjustable speed charger motors during operation in accordance with the dual pattern. More specifically, the control circuitry includes relay means operating switch contacts in the Reliance drive unit to reduce the speed of motor operation for both chargers and thus to reduce the rate of feed by each charger to half the rate when both chargers are being operated simultaneously.

Timer Controlled Dual Operation

In initial consideration of the control circuitry of FIG. 9, let it be assumed that the pattern selector switch SW1 (FIG. 10) has been set for a dual pattern and that the operation selector switch SW2 (FIG. 11) has been set for timer controlled operation. Under these selected conditions, the contacts SW1–1 and SW1–2 (FIG. 9) of the pattern selector will be closed and its contacts SW1–3 and SW1–4 (FIG. 9) will be open as shown by the chart of FIG. 10. Similarly, the contacts SW2–1, SW2–2 and SW2–4 (FIG. 9) will be closed while contacts SW2–3 and SW2–5 will be open as indicated by the chart of FIG. 11.

The control circuitry of FIG. 9 is connected with a 115 V. single phase A.C. current supply by the lines L1 and L2 each of which is provided with a fuse 30. The selector switch contacts SW2–1 and SW2–2 being closed in the respective supply lines L1 and L2, the various circuits of the wiring diagram can be energized provided the various switch and relay contacts included therein are closed. There are nineteen such circuits shown in the wiring diagram by the numbered horizontal lines.

The first such circuit includes as its principal element a control relay 1CR. The circuit also includes the contacts 32 of a push button start switch which is closed manually to start feeding operation, and shortly thereafter, contacts 34, forming a part of the push button start switch, are closed in the 6th circuit. Additionally, the last circuit includes normally closed contacts 3CR-1 of a control relay, which will be mentioned hereinafter, and the normally closed contacts 36 of a push button stop switch which is depressed and opened manually only when the operator wants to stop batch feeding. Thus, the control relay 1CR in the 1st circuit is energized and when this happens, its normally open contacts 1CR-1 in the 2nd circuit are closed. The 2nd circuit is a holding circuit bypassing the contacts 3CR-1 and 32 in the 1st circuit so that the control relay 1CR will remain energized until it is de-energized by opening the stop contacts 36.

Also, when the control relay 1CR is energized, its normally closed contacts 1CR-2 in the 6th circuit are opened. At this point, it should be noted that the push button start switch is of the type which provides for closing of its contacts 32 in the 1st circuit prior to closing of its contacts 34 in the 6th circuit. This prevents energization of the 6th circuit because the control relay 1CR will have been previously energized to open the contacts 1CR-2 in the 6th circuit. It should also be noted that the start switch operates contacts 38 in the 6th circuit line, these contacts being opened with the closing of the contacts 34 therein.

Upon closing of the relay contacts 1CR-1 in the 2nd circuit, a conductor 40 is connected with the line L1 to energize the 13th circuit through the closed contacts SW2-4 of the selector switch SW2 and through a conductor 42. The 13th circuit may be referred to as a first timer circuit and it includes as its principal element the clutch C of a timer 1TM. The said circuit also includes normally closed contacts 3TM-1 which are operated by a timer to be mentioned hereinafter, and it also includes the now closed contacts 3CR-2 of a control relay 3CR to be described. However, at this point, it is to be noted that the control relay 3CR is of the alternating type wherein the contacts 3CR-2 are left closed after one period of energization of the relay 3CR while the contacts 3CR-3 (14th circuit) are left open. After the next period of energization of the relay 3CR, the contacts 3CR-2 will be left open and the contacts 3CR-3 will be left closed.

When the 13th circuit is energized as described, a conductor 44 connected therewith and to the 12th circuit energizes a portion of the said 12th circuit so as to energize the timer motor M therein forming a part of the timer 1TM. Further, upon energizing the clutch C of the timer 1TM, it effects a mechanical closing of the contacts 46 in the 12th circuit so as to maintain the timer 1TM energized for its full period of operation as may be selected and set manually on a control panel. A timer of the type that may be used is known as a "Cycle Progress Timer" manufactured by Automatic Timing and Controls, Inc., at King of Prussia, Pennsylvania. This type timer has a dial visible on a control panel for setting of the desired period.

The timer 1TM controls the time period of operation of the No. 1 or left-hand charger 16. In doing this, the timer 1TM closes a pair of normally open contacts 1TM-1 in the 8th circuit which includes a motor starting relay MS1 and nomally closed contacts 44. The normally closed contacts 44 are part of a thermal overload device and open only in the event of overheating the motor for the No. 1 or left-hand charger 16. The motor starting relay MS1 operates to close contacts (not shown) in the power circuit for the variable speed motor for the charger 16, and the said motor and charger will remain in operation while the starting relay MS1 is energized for the full period of operation of the timer 1TM. The timer 1TM also operates to close normally open contacts 1TM-2 in the 4th circuit which energizes another relay 3TM as will be described. However, the timer 1TM is adapted to close the contacts 1TM-2 only at the end of the timing period for the timer 1TM and then only for a relatively short interval (for example, six seconds). The circuit including the timer 3TM may be referred to hereinafter as the third timer circuit.

During the period of operation of the timer 1TM and motor starting relay MS1, the said relay operates to close normally open contacts MS1-1 in the 11th circuit which includes a green lamp 48. The green lamp 48 gives a control panel indication of the operation of the No. 1 charger 16 for as long as that charger remains in operation.

At the end of the timing period of the timer 1TM when operation of the charger 16 ceases and when the contacts 1TM-2 are closed, the timer 3TM is energized through the closed switch contacts SW1-2 to the clutch C. A conductor 50 extends from the 4th circuit to the 3rd circuit to energize the motor M for the timer 3TM included in the said 3rd circuit. The timer 3TM will remain energized after the contacts 1TM-2 have opened because the clutch when energized will close normally open contacts 52 in the 3rd circuit to keep the timer energized for its full period of operation.

When the timer 3TM is energized, it opens the contacts 3TM-1 in the 13th circuit to prevent energization of the timer 1TM during operation of the timer 3TM. As with the first mentioned timer, the timer 3TM will remain energized for the period for which it is set.

When the timer 3TM is energized, it closes normally open contacts 3TM-2 in the 7th circuit which includes as its principal element a control relay 2CR. The 7th circuit also includes the closed contacts SW1-1 of the pattern selector switch SW1. Thus, it will be seen that the control relay 2CR will remain energized for the timing period of the timer 3TM. This control relay operates to close normally open contacts 2CR-1 in the 9th circuit which is connected to the 8th circuit by a conductor 54 to energize the motor starting relay MS1 for the left-hand or No. 1 charger 16. Additionally, the relay 2CR when energized operates to close normally open contacts 2CR-2 in the 17th circuit which is connected to the 16th circuit by a conductor 56 to energize a motor starting relay MS2. The 16th circuit also includes normally closed contacts 58 operable by a thermal overload device to be opened only in the event of overheating of the motor controlled by the starting relay MS2.

The motor that is controlled by the starting relay MS2 is for the right-hand or No. 2 charger 18, and it will be understood that the relay MS2 will operate to close contacts (not shown) in the power circuit for the said motor. Thus, upon energization of the timer 3TM and the consequent energization of the control relay 2CR for the period set for the timer 3TM, both chargers will be operated. This stage of operation is depicted in FIGS. 2, 4, 6 and 8, and the first such stage shown in FIG. 2 follows the operation of FIG. 1 which was caused by operation of the timer 1TM.

As has been mentioned, when both chargers are operated as shown in FIGS. 2, 4, 6 and 8, they are preferably operated at half their normal rate of speed so that the charge produced by both will be substantially equal to the charge produced by either operating at full speed and independently of the other. To effect this, it will be understood that the control relay 2CR can be utilized to close contacts in the Reliance controller unit so as to reduce the speed of the variable speed motors for both chargers. This can be effected in numerous ways. For example, the closed contacts in the Reliance controller unit may bring double the resistance to the power circuits for the motors so as to reduce their rate of operation by one-half.

The timer 3TM which is energized to energize the control relay 2CR to effect dual operation of the chargers also operates to energize a control relay 3CR in the 5th circuit. More specifically, when the contacts 3TM–2 are closed in the 7th circuit, a path is closed to the control relay 3CR in the 5th circuit through a conductor 60, closed switch contacts 38 in the 6th circuit, and a conductor 62 bridging the 6th and 5th circuits. It will be recalled that the switch contacts 38 are opened momentarily by depressing the push button start switch and then closed again upon release of that switch. This construction and arrangement is provided to prevent energizing the control relay 2CR for dual operation of the chargers when the push button start switch is initially closed. Further, since the switch contacts 34 in the 6th circuit cannot be closed as soon as the contacts 32 are closed in the 1st circuit, it prevents the control relay 3CR from being energized when the start switch is initially depressed.

The control relay 3CR acts as an alternating relay to alternate between opening the contacts 3CR–2 in the 13th circuit while closing the contacts 3CR–3 in the 14th circuit, and vice versa, each time the relay 3CR is energized. The purpose of doing this is to alternate between the timer 1TM and a timer 2TM for operation of the chargers 16 and 18 after a period of dual operation caused by the timer 3TM. In addition to alternating the condition of the contacts 3CR–2 and 3CR–3, control relay 3CR operates to open the normally closed contacts 3CR–1 in the 1st circuit during the period of time that the control relay 3CR is energized. This is done to prevent operation of the control circuitry by pressing the start button with the relay 3CR energized and with the timer 3TM in operation or in condition to be operated. This prevents starting a cycle of operation at the second stage (FIG. 2) with both chargers operating at half speed.

When the timer 3TM completes its period of timed operation, the normally closed contacts 3TM–1 in the 13th circuit will again close and this will energize the timer 2TM for operation of the No. 2 or right-hand charger 18. More specifically, the clutch C in the timer 2TM and in the 14th circuit will be energized through the closed contacts 3TM–1 in the 13th circuit through a conductor 64 and through the now closed contacts 3CR–3 in the 14th circuit. This circuit for the timer 2TM may be referred to hereinafter as the second timer circuit. However, the timer 1TM cannot be energized by the reclosing of the contacts 3TM–1 by reason of the fact that the contacts 3CR–2 in the 13th circuit will now open. The motor M in the timer 2TM is energized simultaneously with the clutch C by its connection in the 15th circuit through a conductor 66 to the 14th circuit. Further, upon energizing the clutch C of the timer 2TM, it will close normally open contacts 68 to retain the timer 2TM energized for the full period for which it is set.

As has been mentioned, the timer 2TM controls operation of the right-hand or No. 2 charger 18, and this is done by closing normally open contacts 2TM–1 in the 16th circuit which includes the motor starting relay MS2. The contacts 2TM–1 will remain closed to assure operation of the motor at full rate for the entire period for which the timer 2TM is set.

At the end of the period of operation of the timer 2TM, it will close normally open contacts 2TM–2 in the 5th circuit for a period of relatively short duration (for example, 6 seconds). The closing of the contacts 2TM–2 in the 5th circuit assures that the timer 3TM will be energized, this being effected by means of a conductor 70 which connects the 5th and 4th circuits so as to energize the timer 3TM after the timer 2TM has timed out. While the timer 2TM is in operation to operate the motor for the No. 2 charger, a green lamp 72 is energized. This is done by the motor starting relay MS2 operating to close normally open contacts MS2–2 in the 19th circuit.

The lamp 72 will be viewable on a control panel to give an indication of the operation of the No. 2 charger 18 whenever that charger is being operated.

From the foregoing description, it should be understood that the batch feeding apparatus will be operated repeatedly through all of the stages of operation shown in FIGS. 1–8 until such time as the push button stop switch is depressed to open the contacts 36 in the 1st circuit which includes the control relay 1CR. When this relay is de-energized, the contacts 1CR–1 in the second circuit open and there is no longer a connection provided with the panel supply line L1 for the conductor 40 which supplies power to all of the timer circuits and to the motor starting relay circuits.

*Timer Controlled "Delay" Pattern Operation*

With the control selector switch SW2 remaining set for timer control as shown in FIG. 11, and with the pattern selector switch SW1 set for delay pattern, the switch contacts SW1–1 in the 7th circuit will be opened rather than closed as shown in FIG. 9 and the switch contacts SW1–4 in the 6th circuit will be closed rather than open. Further, the contacts SW1–2 and SW1–3 in the 4th and 5th circuits, respectively, will remain respectively closed and open as shown by FIG. 10. In this setting of the selector switches, the sequence and operation of the timers 1TM, 3TM and 2TM in the control circuitry of FIG. 9 will be the same as that described in connection with dual pattern operation. However, due to opening of the switch contacts SW1–1 in the 7th circuit, the operation of the timer 3TM will not effect energization of the control relay 2CR which is operated to cause dual operation of the chargers 16 and 18 at half speed.

The timer 3TM will, however, continue to operate the alternating control relay 3CR so as to alternate between operation of the charger 16 and the charger 18 after a period of no charger operation ensuing for the timing period of the timer 3TM. Further, during that timing period, the timer 3TM will be effective to energize an amber lamp 74 in the 6th circuit. This lamp will glow on the control panel to show the operator that the period of time delay is ensuing between alternate operation of the chargers 16 and 18. The lamp 74 is energized in the 6th circuit through the contacts 3TM–2 closed by the timer 3TM, the conductor 60 bridging the 7th and 6th circuits, and the now closed selector switch contacts SW1–4.

*Timer Controlled "Alternate" Pattern Operation*

With the control selector switch SW–2 remaining set on timer control as shown in FIGS. 9 and 11, and with the pattern selector switch SW1 set for alternate pattern operation as shown in FIG. 10, the timer 3TM cannot be energized for simultaneous operation of both chargers 16 and 18. With the selector switch SW1 set for alternate operation, the contacts SW1–1 in the 7th circuit are open to prevent energization of the control relay 2CR which commands dual operation of the chargers 16 and 18. Additionally, the contacts SW1–2 in the 4th circuit are open to prevent energization of the timer 3TM which is used to time dual operation for the period of delay in "delay" operation. Additionally, the contacts SW1–3 are closed in the 5th circuit to the alternating control relay 3CR while the contacts SW1–4 in the 6th circuit are open to prevent energization of the amber lamp 74 which is needed only to indicate the period of delay during delay pattern operation.

However, the starting timer 1TM for the left-hand charger 16 will be energized in the fashion first described and when it completes its cycle of timed operation it will close for a brief period the normally open contacts 1TM–2 in the 4th circuit which thereby energizes the alternating relay 3CR in the 5th circuit through the conductor 70 and the now closed switch contacts SW1–3. When the alternating relay 3CR is energized in this fashion, the contacts 3CR-2 in the 13th circuit are opened to prevent reenergization of the timer 1TM and the contacts 3CR-3 in the 14th circuit are closed to permit energization of the timer 2TM.

When the timer 2TM completes its cycle of timed operation and operation of the No. 2 or right-hand charger 18, it closes the contacts 2TM-2 in the 5th circuit to again energize the alternating control relay 3CR through the closed contacts SW1-3 whereby the condition of the contacts 3CR-2 and 3CR-3 in the 13th and 14th circuits are reversed so that the timer 1TM for the No. 1 or left-hand charger will start immediate operation. Thus, the alternating pattern of timer controlled operation is achieved.

Before leaving timer controlled operation it is to be explained that alternate pattern operation can be achieved without removing the timer 3TM from operation. That is, the timing period for the timer 3TM can be set at "zero," and the selector switch SW1 set for delay or dual operation. With either such setting of the selector switch, the timer 3TM operates after each operation of the timer 1TM or 2TM to operate either the first or second charger. If the timer 3TM is set for a "zero" time period, operation of both chargers is for a "zero" period and alternate pattern operation results.

Further, it will be understood that since each of the three timers can be set for different periods, this provides for great selection in the amount of batch to be directed toward either side or along the central portion of the furnace in any pattern of operation selected under timer control.

*Dual and Single Charger Operation Without Timer Control*

By reference to FIG. 11, it will be observed that whenever the selector switch SW2 is in any position other than the "timer" position, the switch contacts SW2-4 in the 3rd circuit are open. This prevents energization of any of the timers 1TM, 2TM, or 3TM to effect operation of the chargers 16 and/or 18. If the selector switch SW2 is placed in the first position shown in FIG. 11, which calls for operation of both the No. 1 and No. 2 chargers 16 and 18, the switch contacts SW2-1, SW2-2, SW2-3 and SW2-5 will be closed and the contacts SW2-4 will, of course, be open.

In this condition of operation, with the closing of the start button and its contacts 32 in the first circuit to energize the control relay 1CR, the relay contacts 1CR-1 in the 2nd circuit will be closed to energize the conductor 40. Thus, with the switch contacts SW2-3 in the 10th circuit closed, the motor starting relay MS1 for the left-hand or No. 1 charger will be energized through the conductor 54. At the same time, the switch contacts SW2-5 in the 18th circuit being closed will cause energization of the motor starting relay MS2 for the No. 2 or right-hand charger 18, the relay MS2 being energized through the conductor 56. Therefore, both chargers will be operated but at their full selected rate of speed to supply batch to the furnace 10 in a relatively large mass which will drift along the center line thereof.

When switching the selector SW2 from the first position to the third position shown in FIG. 11, which provides for sole operation of the No. 2 charger 18, all of the contacts of the switch SW2 will pass through an off or open position. This prevents the possibility of inadvertent operation of one charger when operation of the other charger is wanted. When the selector is set in the third position, the contacts SW2-1, SW2-2 and SW2-5 are closed, while the contacts SW2-3 in the 10th circuit and the contacts SW2-4 in the 3rd circuit are open.

Then, upon depressing the start push button to energize the control relay 1CR in the 1st circuit and to close the contacts 1CR-1 in the 2nd circuit to provide power in the conductor 40, the motor starting relay MS2 in the 16th circuit will be energized through the closed switch contacts SW2-5 in the 18th circuit and the conductor 56. Therefore, only the No. 2 or right-hand charger 18 will operate and at full speed to direct the charge toward the left-hand side of the furnace as shown, for example, in FIG. 3.

When the selector SW2 is moved from the third position to the fifth position shown in FIG. 11, it passes an "off" position wherein all of its contacts are open. When reaching the fifth position designated for operation of the No. 1 or left-hand charger 16, its contacts SW2-1, SW2-2, SW2-3 are closed and its contacts SW2-4 in the 3rd circuit and SW2-5 in the 18th circuit are open. Under this condition, when the push button start switch is closed to energize the control relay 1CR and to close the contacts 1CR-1, the motor starting relay MS1 in the 8th circuit will be energized through the closed contacts SW2-3 in the 10th circuit and the conductor 54. Thus, only the left-hand or No. 1 charger 16 will be operated at full speed to direct its charge toward the right-hand side of the furnace.

The respective circuits comprising the wiring diagram of FIG. 9 have been referred to for convenient reference to the drawings as the 1st, 2nd, 3rd, etc. In the appended claims, the 13th circuit utilized in energizing the first timer 1TM has been referred to as the 1st circuit. The 14th circuit for energizing the second timer 2TM has been referred to as the 2nd circuit. The 4th circuit for energizing the third timer 3TM has been referred to as the 3rd circuit. A fourth circuit mentioned in the claims refers to the 5th circuit of FIG. 9 containing the alternating relay 3CR. A fifth circuit mentioned in the claims refers to a combination of the timer controlled contacts 1TM-2 or 2TM-2 with that portion of the 5th circuit in the drawings which includes the alternating relay 3CR. Two additional circuits mentioned in the claims are circuits including the motor starting relays MS1 and MS2, and a third additional circuit mentioned in the claims comprises a circuit including the relay 2CR.

The invention claimed is:

1. In a glass melting furnace having two openings to receive batch and having a charger in each opening driven by a variable speed electric motor to feed batch, the combination of means for controlling charger operation comprising a plurality of electrical circuits connectible with a source of energy and which include a first circuit having a first timer operable during its timed period to energize the motor for one charger, a second circuit having a second timer operable during its timed period to energize the motor for the second charger, a normally open third circuit having a third timer operable at the end of its timed period alternately to close said first or second circuits, means operable by either said first timer or said second timer at the end of their timed periods to close said third circuit for the period of operation of said third timer, and additional circuits including means effective to energize both of said motors and means effective to establish the speed of operation of said motors at substantially one-half the speed at which they operate by control of the first and second timers, said additional circuits being closed by said third timer during its timed period.

2. In a glass melting furnace having two openings to receive batch and having a charger in each opening driven by a variable speed electric motor to feed batch, the combination of means for controlling charger operation comprising a plurality of electrical circuits connectible with a source of energy and which include a first circuit having a first timer operable during its timed period to energize the motor for one charger, a second circuit having a second timer operable during its timed period to energize the motor for the second charger, a normally open third circuit having a third timer operable at the end of its timed period alternately to close said first or second circuits, means operable by either said first timer or said second timer at the end of their timed periods to close said third circuit for the period of operation of said third timer, additional circuits including means effective to energize both of said motors and means effective to establish the speed of operation of said motors at substantially one-half the speed at which they operate by control of the first and second timers, said additional circuits being closed by said third timer during its timed period, and selector switch means effective to connect and to disconnect said additional circuits with said source of energy.

3. In a glass melting furnace having two openings to receive batch and having a charger in each opening driven by a variable speed electric motor to feed batch, the combination of means for controlling charger operation comprising a plurality of electrical circuits connectible with a source of energy and which include a first circuit having a first timer operable during its timed period to energize the motor for one charger, a second circuit having a second timer operable during its timed period to energize the motor for the second charger, a normally open third circuit having a third timer, a fourth circuit having means operable by the third timer at the end of its timed period alternately to close said first or second circuits, means operable by either said first timer or said second timer at the end of their timed periods to close said third circuit for the period of operation of said third timer, additional circuits including means effective to energize both of said motors and means effective to establish the speed of operation of said motors at substantially one-half the speed at which they operate by control of the first and second timers, said additional circuits being closed by said third timer during its timed period, said means operable by either said first timer or said second timer at the end of their timed periods being also operable to complete a fifth circuit with said means in the fourth circuit to close said second circuit and to open said first circuit after operation of said first timer and to open said second circuit and to close said first circuit after operation of said second timer, and selector switch means effective to connect said fifth circuit while disconnecting said third circuit with said source of energy and vice versa.

4. In a glass melting furnace having two openings to receive batch and having a charger in each opening driven by a variable speed electric motor to feed batch, the combination of means for controlling charger operation comprising a plurality of electrical ciruits connectible with a source of energy and which include a first circuit having a first timer operable during its timed period to energize the motor for one charger, a second circuit having a second timer operable during its timed period to energize the motor for the second charger, a normally open third circuit having a third timer, a fourth circuit having means operable by the third timer at the end of its timed period alternately to close said first or second circuits, means operable by either said first timer or said second timer at the end of their timed periods to close said third circuit for the period of operation of said third timer, additional circuits including means effective to energize both of said motors and means effective to establish the speed of operation of said motors at substantially one-half the speed at which they operate by control of the first and second timers, said additional circuits being closed by said third timer during its timed period, selector switch means effective to connect and to disconnect said additional circuits with said source of energy, said means operable by either said first timer or said second timer at the end of their timed periods being also operable to complete a fifth circuit with said means in the fourth circuit to close said second circuit and to open said first circuit after operation of said first timer and to open said second circuit and to close said first circuit after operation of said second timer, and selector switch means effective to connect said fifth circuit while disconnecting said third circuit with said source of energy and vice versa.

5. In a glass melting furnace having two openings to receive batch and having a charger in each opening driven by a variable speed electric motor to feed batch, the combination of means for controlling charger operation comprising a plurality of electrical circuits connectible with a source of energy and which include a first circuit having a first timer operable during its timed period to energize the motor for one charger, a second circuit having a second timer operable during its timed period to energize the motor for the second charger, a normally open third circuit having a third timer operable at the end of its timed period alternately to open and to close said first and second circuits, means operable by either said first timer or said second timer at the end of their timed periods to close said third circuit for the period of operation of said third timer, two additional circuits respectively including means effective to energize said motors, means effective to establish the speed of operation of said motors at substantially one-half the speed at which they operate by control of the first and second timers, both of said last mentioned means being operable by said third timer during its timed period, and selector switch means effective to connect and to disconnect said first, second and third circuits simultaneously with said source of energy and effective selectively to connect and to disconnect said two additional circuits with said source of energy.

6. In a glass melting furnace having two openings to receive batch and having a charger in each opening driven by a variable speed electric motor to feed batch, the combination of means for controlling charger operation comprising a plurality of electrical circuits connectible with a source of energy and which include a first circuit having a first timer operable during its timed period to energize the motor for one charger, a second circuit having a second timer operable during its timed period to energize the motor for the second charger, a normally open third circuit having a third timer operable at the end of its timed period alternately to open and to close said first and second circuits, means operable by either said first timer or said second timer at the end of their timed periods to close said third circuit for the period of operation of said third timer, two additional circuits respectively including means effective to energize said motors, a third additional circuit including means effective to establish the speed of operation of said motors at substantially one-half the speed at which they operate by control of the first and second timers, all of said additional circuits being closed by said third timer during its timed period, selector switch means effective to connect and to disconnect all of said additional circuits with said source of energy, and selector switch means for connecting and disconnecting said first, second and third circuits simultaneously with said source of energy and for selectively closing and connecting and disconnecting said two additional circuits with said source of energy.

References Cited in the file of this patent
UNITED STATES PATENTS
2,246,375    Lyle _____ June 17, 1941
FOREIGN PATENTS
114,234    Australia _____ Nov. 13, 1941